(12) United States Patent
Whalen

(10) Patent No.: US 10,773,999 B2
(45) Date of Patent: Sep. 15, 2020

(54) RARE EARTH SILICATE COATINGS SOLVOTHERMALLY GROWN OVER HIGH TEMPERATURE CERAMIC COMPONENTS

(71) Applicant: HONEYWELL INTERNATIONAL INC., Morris Plains, NJ (US)

(72) Inventor: Terence Whalen, Morristown, NJ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 384 days.

(21) Appl. No.: 15/903,347

(22) Filed: Feb. 23, 2018

(65) Prior Publication Data
US 2019/0263718 A1 Aug. 29, 2019

(51) Int. Cl.
| | | |
|---|---|---|
| C01B 33/20 | (2006.01) | |
| C03C 27/04 | (2006.01) | |
| B32B 9/00 | (2006.01) | |
| B32B 17/06 | (2006.01) | |
| C01F 17/00 | (2020.01) | |
| C03C 3/068 | (2006.01) | |

(Continued)

(52) U.S. Cl.
CPC ............ *C03C 27/044* (2013.01); *B32B 9/005* (2013.01); *B32B 17/06* (2013.01); *C01B 33/20* (2013.01); *C01F 17/00* (2013.01); *C03C 3/068* (2013.01); *C04B 41/009* (2013.01); *C04B 41/5024* (2013.01); *C04B 41/85* (2013.01); *F01D 5/288* (2013.01)

(58) Field of Classification Search
CPC ....... C03C 27/044; C03C 3/068; C01F 17/00; C01B 33/20; B32B 17/06; B32B 9/005; B32B 18/00; C23C 22/00; C23C 22/02
See application file for complete search history.

(56) References Cited

U.S. PATENT DOCUMENTS 3,556,988 A * 1/1971 McVeigh ............... B01J 29/088
208/120.1
4,800,187 A * 1/1989 Lachman ............. B01J 37/0207
502/64

(Continued)

FOREIGN PATENT DOCUMENTS

EP 0314336 B1 5/1989

OTHER PUBLICATIONS

Chen, H. et al.; Hydrothermal Synthesis of Ytterbium Silicate Nanoparticles; Inorganic/Chemistry; Inorg. Chem. 2010, 49, 1942-1946 DOI: 10.1021/ic9023585; Nov. 2009.

*Primary Examiner* — Nathan H Empie
(74) *Attorney, Agent, or Firm* — Lorenz & Kopf, LLP

(57) ABSTRACT

Methods are provided for forming high temperature coating over ceramic components, such as ceramic turbomachine components. In various embodiments, the method includes the step or process of at least partially filling a reactor vessel with a reaction solution containing a solution-borne rare earth cation source. A silicon-containing surface region of a ceramic component is submerged in the reaction solution, and a solvothermal growth process is carried-out. During the solvothermal growth process, the reaction solution is subject to elevated temperature and pressure conditions within the reactor vessel in the presence of a silicate anion source, which reacts with the solution-borne rare earth cation source to grow a rare earth silicate layer over the silicon-containing surface region of the ceramic component.

20 Claims, 3 Drawing Sheets

(51) Int. Cl.
*C04B 41/85* (2006.01)
*F01D 5/28* (2006.01)
*C04B 41/50* (2006.01)
*C04B 41/00* (2006.01)

(56) References Cited

U.S. PATENT DOCUMENTS

| | | | |
|---|---|---|---|
| 6,200,483 B1 * | 3/2001 | Cutler | B01J 47/00 210/685 |
| 6,440,885 B1 | 8/2002 | Pierotti et al. | |
| 6,562,409 B2 | 5/2003 | Koshkarian et al. | |
| 2004/0033180 A1 | 2/2004 | Matsukata et al. | |
| 2011/0027517 A1 | 2/2011 | Kirby et al. | |
| 2012/0004332 A1 * | 1/2012 | Yilmaz | C01B 39/026 521/50 |
| 2016/0169824 A1 * | 6/2016 | Shin | G01N 27/127 73/31.06 |

\* cited by examiner

RARE EARTH SILICATE COATINGS SOLVOTHERMALLY GROWN OVER HIGH TEMPERATURE CERAMIC COMPONENTS

TECHNICAL FIELD

The following disclosure relates generally to high temperature coatings and, more particularly, to methods for solvothermally growing rare earth silicate coatings over high temperature ceramic components, such as ceramic turbomachine components.

ABBREVIATIONS

Abbreviations appearing relatively infrequently in this document are defined upon initial usage, while abbreviations appearing more frequently in this document are defined below.
EBC—Environmental Barrier Coating;
GTE—Gas Turbine Engine;
RE—Rare Earth;
TBC—Thermal Barrier Coating;
° C.—degrees Celsius;
wt %—weight percentage.

BACKGROUND

Relative to turbomachine components composed of superalloy materials, turbomachine components composed of advanced ceramics are capable of achieving increased temperature tolerances, lower densities, and weight savings for flight applications. Ceramic turbomachine components are not without limitations, however, and are often prone to deleterious chemical reactions within the high temperature turbomachine environment. Turbomachine components composed of silicon-ceramic materials, for example, are susceptible to recession due to high temperature reactions with mixtures of water vapor and oxygen (colloquially, "steam"). The silicon contained in such silicon-ceramic materials readily oxides to form silica, which may then react with steam at elevated temperatures to form volatile silicon hydroxide. Sublimation of the silicon hydroxide accelerates erosion of the silicon-ceramic material and drives recession of the component body. EBCs can be formed over the gas-exposed surfaces of ceramic turbomachine components for enhanced protection from high temperature reactions. This is an imperfect solution, however. Conventional EBCs rely on metallic bondcoats to join the EBC to the underlying component body. The EBCs may be prone to ingress of high temperature steam, which may penetrate to the underlying metallic bondcoat. The metallic bondcoat may itself contain silicon and, thus, may be similarly prone to structural degradation due to detrimental high temperature reactions; e.g., such reactions may result in bondcoat expansion, oxidation, and fractures leading to premature EBC spallation and failure.

An ongoing demand thus exists for methods by which protective coatings and coating systems can be formed over ceramic turbomachine components and other high temperature ceramic components, while overcoming the limitations identified above. Ideally, embodiments of such methods would permit the formation of high temperature coating materials over ceramic components in a manner reducing, if not eliminating reliance upon silicon-containing metallic bondcoats, whether such coating materials ultimately serve as a standalone protection solution, as a non-metallic bondcoat over which additional coating layers are formed, or as a precursor material further modified by additional processing to yield the final high temperature coating or coating system. It would also be desirable for methods to enable components having relatively complex surface geometries to be coated in a thorough and controlled manner. Other desirable features and characteristics of embodiments of the present invention will become apparent from the subsequent Detailed Description and the appended Claims, taken in conjunction with the accompanying drawings and the foregoing Background.

BRIEF SUMMARY

Methods are provided for forming high temperature coating over ceramic components, such as ceramic turbomachine components. In various embodiments, the method includes the step or process of at least partially filling a reactor vessel with a reaction solution containing a solution-borne RE cation source. A silicon-containing surface region of a ceramic component is submerged in the reaction solution, and a solvothermal growth process is carried-out. During the solvothermal growth process, the reaction solution is subject to elevated temperature and pressure conditions within the reactor vessel in the presence of a silicate anion source, which reacts with the solution-borne RE cation source to grow an RE silicate layer on the silicon-containing surface region of the ceramic component. In certain instances, a surface oxide present on the silicon-containing surface region may be exploited as the silicate anion source by, for example, dissolving the surface oxide into the reaction solution. In other embodiments, a different chemical species may be added to the reaction solution and serve as the silicate anion source. A combination of these approaches can also be employed. After coating formation, the RE silicate coating may be modified by further processing and/or additional coating layers may be formed over the RE silicate coating, which may, in effect, serve as a bondcoat. Alternatively, the RE silicate coating may be employed as a standalone protective coating for the ceramic component.

In another embodiment, the method includes the steps or processes of growing a surface oxide over a surface of the ceramic component, dissolving at least a portion of the surface oxide in a reaction solution to produce a silicate anion source, and forming a rare earth silicate coating over the surface of the ceramic component after dissolving at least a portion of the surface oxide in the reaction solution. The step of forming includes, in turn, reacting the silicate anion source with a rare earth cation source further contained in the reaction solution to form at least one rare earth silicate layer over the surface of the ceramic component. In certain embodiments, dissolving may be accomplished by contacting the surface oxide with ammonia hydroxide contained in the reaction solution. In other embodiments, the step of reacting may include: (i) reaction the silicate anion source with the rare earth cation source to form a base rare earth silicate layer over the surface of the ceramic component; and (ii) forming one or more additional rare earth silicate layers over the base rare earth silicate layer to impart the rare earth silicate coating with a desired thickness.

Embodiments of methods for producing rare earth silicate coatings over silicon-containing surface regions of components are further provided. In various embodiments, the method includes placing a component in a reaction vessel at least partially filled with a reaction solution. The reaction vessel is then hermetically sealed and heated to increase the temperature and pressure of the reaction solution to form a base RE silicate layer over the silicon-containing surface region. The base RE silicate layer is formed as product of a reaction between a silicate anion source and a rare earth ration source dissolved in the reaction solution. In certain embodiments, the method may further include the step of growing silica scale over the silicon-containing surface region to an average thickness between about 0.5 and about 2 microns prior to placement of the component in the reaction vessel. In other embodiments, the method may further include growing one or more additional RE silicate layers over the base silicate layer to impart the RE silicate coating with a predetermined thickness.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
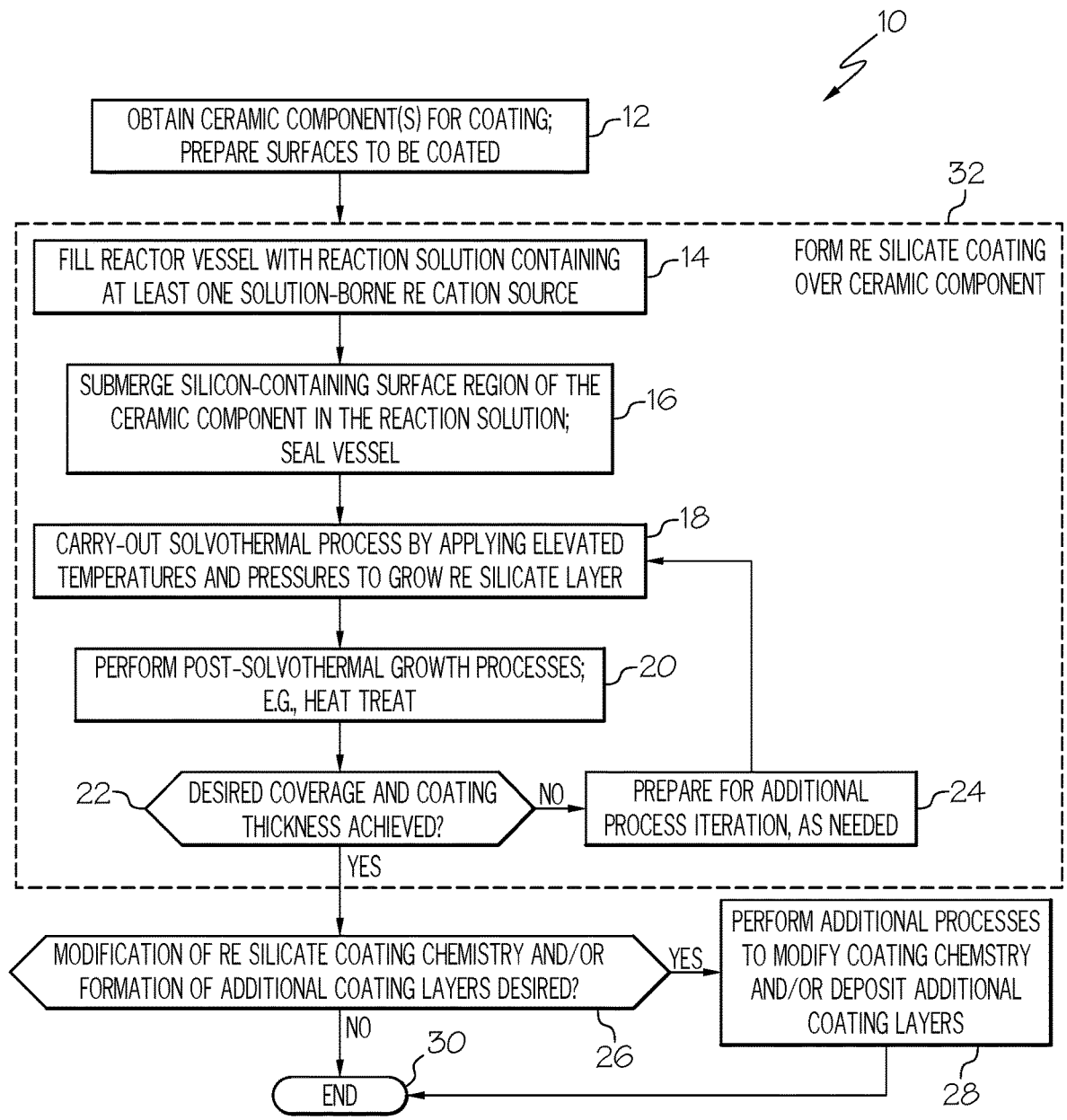
FIG. 1 is a flowchart setting-forth an exemplary coating formation process during which an RE silicate coating is solvothermally grown over a ceramic component, such as a ceramic turbomachine component.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect. As further appearing herein, statements indicating that a first layer is "bonded to" or "joined to" a second layer, surface, or body do not require that that the first layer is directly bonded to and intimately contact the second layer, surface, or body unless otherwise specifically stated.

Definitions

The following definitions apply throughout this document. Those terms not expressly defined here or elsewhere in this document are assigned their ordinary meaning in the relevant technical field.

Ceramic—an inorganic and non-metallic material, whether crystalline or amorphous in structure. The term "ceramic" encompasses both monolithic and composite materials including silicon carbide (SiC), silicon nitride ($Si_3N_4$), and silicon carbide-silicon carbide (SiC/SiC) composites.

Ceramic Component—A component (defined below) predominately composed of at least one ceramic (defined above) by wt %.

Coating—A body of material formed over a component surface, whether as a single layer or as multiple layers.

Coating System—A coating structure containing at least two coating layers having varying compositions; e.g., a coating system may contain an EBC or TBC joined to a component surface by a bondcoat.

Component—Any article of manufacture over which a coating or coating system can be formed. This term is synonymous with or encompasses similar terms including "substrate," "part," and "workpiece."

Hydrothermal Growth Process—A solvothermal growth process (defined below) in which an aqueous solvent is utilized.

Metallic Bondcoat—A bondcoat predominately composed of one or more metallic constituents by wt %.

Rare Earth (RE) Silicate Coating—A coating (defined above) predominately composed of at least one RE silicate by wt %.

Silicon-Ceramic Component—A component (defined above) predominately composed of at least one ceramic and silicon by wt %.

Solvothermal Growth Process—A process carried-out to grow a desired product layer or coating from solution under elevated temperature and pressure conditions, regardless of solvent type; e.g., whether alcohol-based, aqueous, or other.

Overview

The following describes processes by which RE silicate coatings are solvothermally grown over selected surfaces of ceramic components. The RE silicate coatings described herein can consist of a single RE silicate layer or, instead, may contain multiple RE silicate layers successively grown or built-up to bring the coating to a desired thickness. Once grown, the RE silicate coating may serve as a standalone protection solution, as a non-metallic bondcoat over which additional coating layers are formed, or as an intermediary precursor material further processed to arrive at a final coating composition. In some instances, the RE silicate coating can be utilized to form protective coatings or coating systems over ceramic turbomachine components, while eliminating reliance on conventional (e.g., silicon-containing) metallic bondcoats. For example, in one non-limiting implementation, the RE silicate coating can serve as a non-metallic bondcoat over which an EBC is subsequently formed. As compared to a legacy coating system containing an EBC joined to a component by a metallic bondcoat, this may enhance the reliability and service lifespan of the coating or coating system within a high temperature turbomachine environment by negating common failure pathways associated with conventional metallic bondcoats. As a further advantage, the solvothermal growth process is a non-line-of-slight process enabling geometrically-complex part surfaces to be coated in a highly reliable and thorough manner. Embodiments of the RE silicate coating are consequently well-suited for formation over ceramic turbomachine components exposed to peak gas velocities and temperature within the turbomachine environment including, for example, turbines, turbine shrouds, and ducting within the turbine section of a GTE. This notwithstanding, the RE silicate coatings described herein can be grown over any type of ceramic component having a silicon-containing surface region, regardless of application or usage.

Embodiments of the coating formation process may involve the preparation of a reaction solution, which contains at least one solution-borne RE cation source and which is introduced into the chamber of a reactor vessel. A silicon-containing surface region of the ceramic turbomachine component is then submerged in the reaction solution, the reactor vessel sealed, and the solvothermal growth process carried-out. During the solvothermal growth process, the reaction solution is subject to elevated temperature and pressure conditions within the reactor vessel in the presence of at least one silicate anion source. The silicate anion source reacts with the solution-borne RE cation source to grow an RE silicate layer over the silicon-containing surface region of the ceramic turbomachine component. In certain embodiments, the silicate anion source can be a native surface oxide present on the ceramic turbomachine component. In this case, the reaction solution may contain a pH modifier or other additive promoting dissolution of the native surface oxide during or, perhaps, prior to the solvothermal growth process to better avail the surface oxide for reaction with the RE cation source. Additionally or alternatively, the reaction solution may contain a solution-borne silicate anion additive, which is added to the reaction solution and serves as a silicate anion source or donor during the solvothermal growth process.

The above-described solvothermal growth process may be continued or repeated, as needed, to achieve the desired coverage and thickness of the RE silicate coating over the targeted surface or surfaces of the ceramic component. In instances in which batch-type processing is utilized, the solvothermal growth process may be conducted on an iterative basis, with partial refilling or exchange of the reaction solution potentially carried-out between process iterations, to successively grow any practical number of RE silicate layers building the RE silicate coating to a desired final thickness. Heat treatment can also be performed after each process iteration or following the final process iteration to densify the coating, to refine the coating microstructure or grain size, to relieve residual stress within the coating, or for other reasons. Between process iterations or after the final process iteration, polishing or another material removal process may be utilized to, for example, bring the RE silicate coating to a final thickness or impart the RE silicate coating with a desired surface finish.

Following the solvothermal growth process, the RE silicate coating may or may not be subject to further processing to yield the final high temperature coating or coating system. In implementations in which the RE silicate coating serves as a standalone protection solution, further modification of the RE silicate coating or the formation of additional coating layers may be unnecessary; hence, the coating formation process may conclude after solvothermal growth of the RE silicate coating and any other secondary processing steps, such as heat treatment, polishing, or the like. In other implementations, additional processing steps may be conducted following the solvothermal growth process to structurally or chemically modify the RE silicate coating; e.g., by depositing and diffusing additional materials into the RE silicate coating. In still other implementations, additional coating layers may be formed over the newly-grown RE silicate coating. For example, in this latter case, the newly-grown RE silicate coating can be utilized as a non-metallic bondcoat, with one or more additional coating layers providing environmental and/or thermal barrier protection subsequently formed over the RE silicate coating. An overarching discussion of an exemplary process suitable for solvothermally growing an RE silicate coating over a ceramic component, such as a silicon-ceramic turbomachine component, will now be set-forth in conjunction with FIG. 1.

Exemplary High Temperature Coating Formation Processes

FIG. 1 is a flowchart of an exemplary coating formation method 10, which can be carried-out to form a protective coating or coating system over any number of ceramic components. In the present example, coating formation method 10 contains a number of process steps identified as STEPS 12, 14, 16, 18, 20, 22, 24, 26, 28, 30, each of which is discussed below. STEPS 14, 16, 18, 20, 22, 24 are conducted pursuant to an overarching sub-process referred as "RE silicate coating formation sub-process 32." Sub-process 32 is performed to grow an RE silicate coating over selected surfaces of ceramic components. Sub-process 32 may be particularly useful for growing the RE silicate coating over silicon-containing surface regions of ceramic components, whether the silicon content is concentrated adjacent the component surfaces to be coated or is distributed throughout the component body; e.g., as may be the case when the component is fabricated from a silicon-ceramic material, such as SiC, SiN, or SiC—SiC. Depending upon the particular manner in which method 10 is implemented, each illustrated process step may entail a single step or multiple sub-steps. In alternative embodiments of coating formation method 10, additional process steps may be performed, certain steps may be omitted, and/or the illustrated steps may be performed in alternative sequences.

At STEP 12 of method 10, the ceramic component or components to be coated are obtained, and the appropriate component surfaces are prepared for coating. For ease of description, the following will primarily describe the solvothermal growth of an RE silicate coating over a principal surface of a single ceramic component. It will be appreciated, however, that any practical number of ceramic components can be concurrently coated in parallel during method 10, with the below-described RE silicate coating produced over any desired number of surfaces. The high temperature coating and coating systems fabricated utilizing method 10 and, specifically, the RE silicate coatings produced pursuant to sub-process 32 are usefully formed over ceramic components containing silicon and deployed within high temperature operating environments. Particular utility may be found in forming embodiments of the RE silicate coatings over surfaces of silicon-ceramic turbomachine components exposed to core gas flow at or near peak temperatures and velocities, including the outer surfaces of GTE turbines and the inner circumferential surfaces of turbine shrouds.

Component surface preparation can involve cleaning and steps taken to refine surface topology, such as polishing. When the ceramic component already possesses or is capable of growing a native surface oxide layer, such as a silica scale, and when it is desired to exploit the surface oxide as a silicate anion source during the solvothermal growth process, any combination of mechanical, chemical, and thermal pretreatments may be employed to modify the amount and character of the surface oxide. For example, an oxidation process may be conducted prior to the solvothermal growth process to increase the quantity of the surface oxide present on the ceramic component and thereby ensure adequate surface oxide is available to complete the desired reactions when subsequently growing the RE silicate layer over the component surfaces. This may be accomplished by placing the component in an oxidizing atmosphere under elevated temperature conditions for a duration of time sufficient to grow the surface oxide to a desired average thickness; e.g., an average thickness between 0.5 and 2 microns (μm) in an embodiment. In other instances, a surface oxide may not be present on the component surfaces to be coated. As a still further possibility, a surface oxide may be present on the component surfaces, but may not be leveraged as a silicate anion source during the solvothermal growth process. However, even in this latter case, the presence of the surface oxide may benefit the solvothermal growth process by serving as a template upon which the desired product (the base RE silicate layer) may nucleate.

After surface preparation at STEP 12, coating formation method 10 continues to sub-process 32. During sub-process 32, an RE silicate coating is solvothermally grown over the targeted surfaces of the ceramic component subject to processing. As indicated in FIG. 1, sub-process 32 commences at STEP 14 during which the chamber of a reactor vessel is filled, in whole or in part, with a reaction solution. The formulation of the reaction solution will vary among embodiments, but will typically contain, at minimum, a liquid solvent or carrier and at least one constituent capable of serving as an RE cation source or donor. Suitable constituents include RE nitrates, chlorides, and hydroxides, as well as combinations thereof. The preceding list is non-exhaustive; various other compounds or additives capable of serving as RE cation sources during the solvothermal growth process can also be utilized. In embodiments, the constituent(s) or ingredient(s) serving as the RE cation source(s) can be added to the solvent in a wet state or a dry state as, for example, a liquid or powder. Dissolution of the constituent within the solvent may then occur to yield a solution-borne RE cation source, with such dissolution potentially promoted utilizing mechanical agitation, sonication, or the like. The type of RE cations introduced into solution in this manner will vary depending upon the desired final composition of the RE silicate coating. However, in embodiments, one or more RE cations may be chosen from the following group: gadolinium (Gd), lanthanum (La), lutetium (Lu) neodymium (Nd), samarium (Sm), scandium (Sc), terbium (Tb), ytterbium (Yb), yttrium (Y), and combinations thereof.

An aqueous solvent is conveniently selected for usage in the reaction solution, in which case the ensuing solvothermal growth process may be more specifically referred to as a "hydrothermal growth process." This notwithstanding, the reaction solution can contain any type of solvent appropriate for dissolution of the RE cation source and the silicate anion source. Non-aqueous organic solvents suitable for usage including alcohols, such as hexanol, toluene, and propene. Additional constituents or ingredients may also be added to the reaction solution to adjust the properties thereof. For example, one or more chemical agents may be added for pH regulation. As a more specific example, at least one hydroxide species, such as ammonia or sodium hydroxide, can be added to the aqueous reaction solution to bring the solution to within a desired pH range of, for example, 10±1. If desired, a chelating agent or structure directing agent may be added to the reaction solution, with suitable examples being trisodium citrate and ethylenediamine. Such agents may modify the concentrations of free RE and silicate ions over the temperature range of the solvothermal reaction and/or serve as coordinating species better ensuring the proper orientation of the RE and silicate ions during the solvothermal growth process.

Solvent volume will typically be selected based upon reaction vessel dimensions and the cumulative surface area targeted for coating. Generally, it may be desirable to minimize the total solvent volume utilized, while ensuring that adequate solvent is present to allow complete dissolution of the reaction precursor materials. With respect to the RE and silicate ion sources, these materials will typically be added in sufficient quantity to ensure growth of the RE silicate coating to a desired thickness, while providing adequate coverage of all component surfaces targeted for coating. In embodiments, the RE precursor may be batched in molar ratio respective to the silicate anion source and the expected product stoichiometry. Consider, for example, an implementation in which the desired product coating is $Yb_2Si_2O_7$, and an RE nitrate (e.g., $Yb(NO_3)_3$) is selected for usage as the RE cation source. In this case, the RE nitrate may be batched in 1:1 molar ratio respective to the silicate anion source or sources within the reaction solution. Comparatively, and as further discussed below, the silicate anion source or sources within the reaction solution may be provided as a discrete chemical species added to the solution, as a surface oxide (e.g., $SiO_2$) present on the component surfaces and dissolved into the solution, or utilizing a combination of these approaches.

In certain embodiment of coating formation method 10, the reaction solution is prepared to further contain at least one silicate anion source introduced into reaction solution as a discrete additive or separate ingredient. For example, when the reaction solution contains an aqueous solvent, the silicate anion source may be provided by introducing into solution an additive that is readily soluble in water, such as tetraethoxysilane (TEOS); an additive that has a relatively poor water solubility, such as fumed silica; and an additive that is near water-insoluble, such as quartz. In the latter instances, the low and near insoluble sources may be rendered usable through appropriate modifications to the solution pH and reaction conditions to increase solubility during and/or prior to the solvothermal growth reaction. Additives to the reaction solution serving as the silicate anion donors or sources may be similarly selected for usage in other non-aqueous (e.g., alcohol-based) solvents. In some instances, the reaction solution may be formulated to contain multiple types of silicate anion sources, which dissolve at different rates into solution to better maintain silicate anion availability over the duration of the solvothermal growth process.

In other embodiments of method 10, a native surface oxide present on the ceramic component surfaces may be leveraged as a silicate anion source, which is reacted with the RE cation source during the solvothermal growth process. In this case, the reaction solution chemistry and reaction parameters (e.g., temperatures and pressures) may be optimized to promote dissolution of the surface oxide into solution. Additionally, as noted elsewhere in this document, the amount of native surface oxide present on the component surfaces may be tailored to support the desired product reaction, in its full extent, and perhaps increased if needed to prevent the surface oxide from becoming a limiting factor during the solvothermal growth reaction. In this regard, certain embodiments of method 10 may include the step or processes of approximating an amount of native surface oxide present on the silicon-containing surface region of a ceramic component; and then selecting or tailoring the amount of the solution-borne rare earth cation source within the reaction solution based, at least in part, on the amount of native surface oxide and an expected product stoichiometry. If additional surface oxide volume is needed or desired, the native surface oxide may be thermally grown to an appropriate thickness prior to carrying-out the solvothermal growth process described below.

As noted above, certain chemical species may be added to the reaction solution to promote dissolution of the surface oxide when present on the silicon-containing surface region and leveraged as a silicate anion source. For example, when the surface oxide is silica, a surface oxide dissolving agent (e.g., ammonia hydroxide) may be added to the reaction solution to dissolve the silica present as a surface oxide and provide a silicate-based species in solution. However, when such chemical species are utilized, the possibility may arise of undercutting the product layers as the solvothermal growth process progresses. Consider, for example, an implementation in which a thin layer of silica remains underneath the growing RE silicate layer. This underlying silica layer may continue to be etched away during the solvothermal growth process, potentially resulting in detachment of the RE silicate layer from the component surface.

To preclude the above-noted issues associated with potential RE silicate layer undercutting, embodiments of the solvothermal growth process may be controlled such that a surface oxide dissolving agent (e.g., ammonia hydroxide) is initially present in a first quantity at the initial stages of the solvothermal growth process and then reduced in quantity, if not eliminated from the reaction solution as the solvothermal growth process progresses. Embodiments of method 10 may thus include the steps or processes of: (i) selecting the reaction solution to contain a silicon oxide dissolving agent in which the native surface oxide dissolves during the solvothermal growth process to react with the solution-borne rare earth cation source; and (ii) after elapse of an initial time period during which at least a portion of the native surface oxide dissolves in the reaction solution, continuing to grow the rare earth silicate layer over the silicon-containing surface region of the ceramic turbomachine component, while reducing exposure of the silicon-containing surface region to the silicon oxide dissolving agent. For example, in one approach, the reactor may be drained in situ of a first reaction solution, which contains a surface oxide dissolving agent, after a predetermined duration of time; and subsequently refilled with a second reaction solution that is substantially identical to the first reaction solution, but lacking (or containing a lesser amount of) the surface oxide dissolving agent. Notably, a combination of the aforementioned approaches may also be employed in further embodiments of coating formation method 10; that is, embodiments of method 10 can leverage a native surface oxide as a first silicate anion source, while further utilizing one or more compounds added to the reaction solution to serve as additional silicate anion sources.

Progressing next to STEP 18 of coating formation method 10, the solvothermal growth process is carried-out. In various embodiments, the component and reaction solution are sealed within a closed reaction vessel, which is heated in accordance with a preestablished heating schedule. Generally, the temperature choice and heating schedule will depend upon reaction solution chemistry and other parameters. However, by way of example, a first temperature (e.g., a temperature greater than 120° C.) may be utilized to achieve an appreciable dissolution of the silicate. Comparatively, a second, higher temperature (e.g., a temperature exceeding 200° C.) may better provide an acceptable reaction rate and product yield. Conversely, exceeding a third maximum temperature threshold above this second temperature may cause the location of nucleating product to shift or transfer from the component surface to the reaction solution; e.g., in testing, temperatures exceeding 350° C. and, perhaps, exceeding about 300° C. have been found to drive the product formation into the solution and from the component surface. Accordingly, in embodiments, the solvothermal reaction may be conducted at peak processing temperatures exceeding about 150° C.; preferably a peak processing temperature between 150° C. and 400° C.; and, more preferably, a peak processing temperature between 200° C. and 350° C. The elevated pressures within the sealed internal environment of the reaction vessel may be generated autogenously; that is, may occur inherently due to heating of the reaction solution within an enclosed volume. In other embodiments, elevated pressure may be actively supplied to the reaction vessel chamber and/or the reaction solution may be circulated through the reaction vessel during the solvothermal growth process.

The duration of the solvothermal growth process is generally determined as a function of target temperatures and desired product yield. Relatively abbreviated time periods may be utilized to reduce surface coverage, while more prolonged solvothermal growth process durations may increase surface coverage. In certain instances, however, extended process durations can result in secondary reaction pathways having undesirable results. Consequently, a finite time and temperature window may be defined for specified chemistries. In experimentation, a process duration on the order of about 4 to about 24 hours at a substantially constant elevated temperature (e.g., a temperature between about 220° C. and 260° C.) was found to produce favorable results. After the desired reaction time, the reactor vessel and its contents are allowed cooled. The newly-coated component may then be removed from the reactor vessel, inspected, and washed in deionized water.

By definition, the RE silicate layer grown over the ceramic substrate during sub-process 32 predominately consists of at least one RE silicate, by wt %. As noted above, the RE silicates may be selected from the aforelisted group of Gd, La, Lu, Nd, Sm, Sc, Tb, Yb, Y, and combinations thereof. In one specific, albeit non-limiting implementation, the RE silicate coating is predominately composed of ytterbium disilicate ($Yb_2Si_2O_7$) by wt %. In other implementations, the RE silicate coating may contain more than about 80 wt %, preferably more than about 90 wt %, and still more preferably more than about 95 wt % ytterbium disilicate. The RE silicate coating may be substantially devoid of organic materials in embodiments; the term "substantially devoid," as appearing herein, defined as containing less than 1 wt % organic materials. The RE silicate coating can contain lesser amounts of other constituents, such as nano- or micro-scale particles embedded in the coating to enhance the properties thereof.

Advancing next to STEP 20 of method 10, and following the initial or latest iteration of the solvothermal growth reaction, heat treatment may be applied to the newly-grown RE silicate coating or layer. Heat treatment may be performed at a peak temperature exceeding the peak temperature of solvothermal growth process to promote adhesion, to densify the coating, to modify the microstructure (e.g., grain size) of the coating, or for other reasons. In certain instances, heat treatment may also be conducted to grow fresh native surface oxide, such as a thickened silica scale, on the remaining exposed surfaces of the ceramic component between process iterations when the surface oxide is leveraged as a silicate anion source. In embodiments, a relatively brief hold at first elevated temperature (e.g., about 1200° C.) may be utilized to consolidate and, perhaps, further promote grown RE silicate layer adhesion. A brief hold at a second, higher temperature (e.g., about 1400° C.) may further be utilized to generate additional surface oxide. If additional surface area coverage or coating thickness is desired, the newly-generated surface oxide may be utilized to repeat the above-described reaction utilizing the same or similar conditions. Finally, at STEP 22, it is determined whether adequate coverage and thickness of the RE silicate coating has been achieved. Further repetitions are then employed to obtain varying degrees of coverage and coating thickness as appropriate to satisfy or exceed end use requirements, as indicated in FIG. 1 by STEP 24. When additional process iterations are carried-out in this manner, the initially-formed RE silicate layer may be referred to as the "base" RE silicate layer herein.

In the above-described manner, direct growth of the protective coating material on the high temperature ceramic component is achieved. The amount of product growth may be tailored to be utilized as a standalone protective coating or act as a bondcoat replacement, allowing the subsequent deposition of EBC materials for usage in utilized in further reactions to produce useful protective material on the targeted ceramic component surface. The RE silicate coating, as considered in isolation and in a chemically unchanged state following the solvothermal grow process, may consequently serve as the final protective coating in embodiments of method 10. This is indicated in the flowchart of FIG. 1 by the path progressing through STEPS 26, 30. Alternatively, as indicated by the path progressing through STEPS 26, 28, 30 in FIG. 1, the RE silicate coating may be an intermediary or precursor coating that is further processed to arrive at the final coating composition; and/or additional coatings layers may be formed over the RE silicate coating, which may effectively serve as a bondcoat. For example, in one useful, albeit non-limiting implementation, the RE silicate coating can serve as a bondcoat over which an EBC is subsequently formed.

Illustrated Examples of the Solvothermal Growth Process

Figure 2:
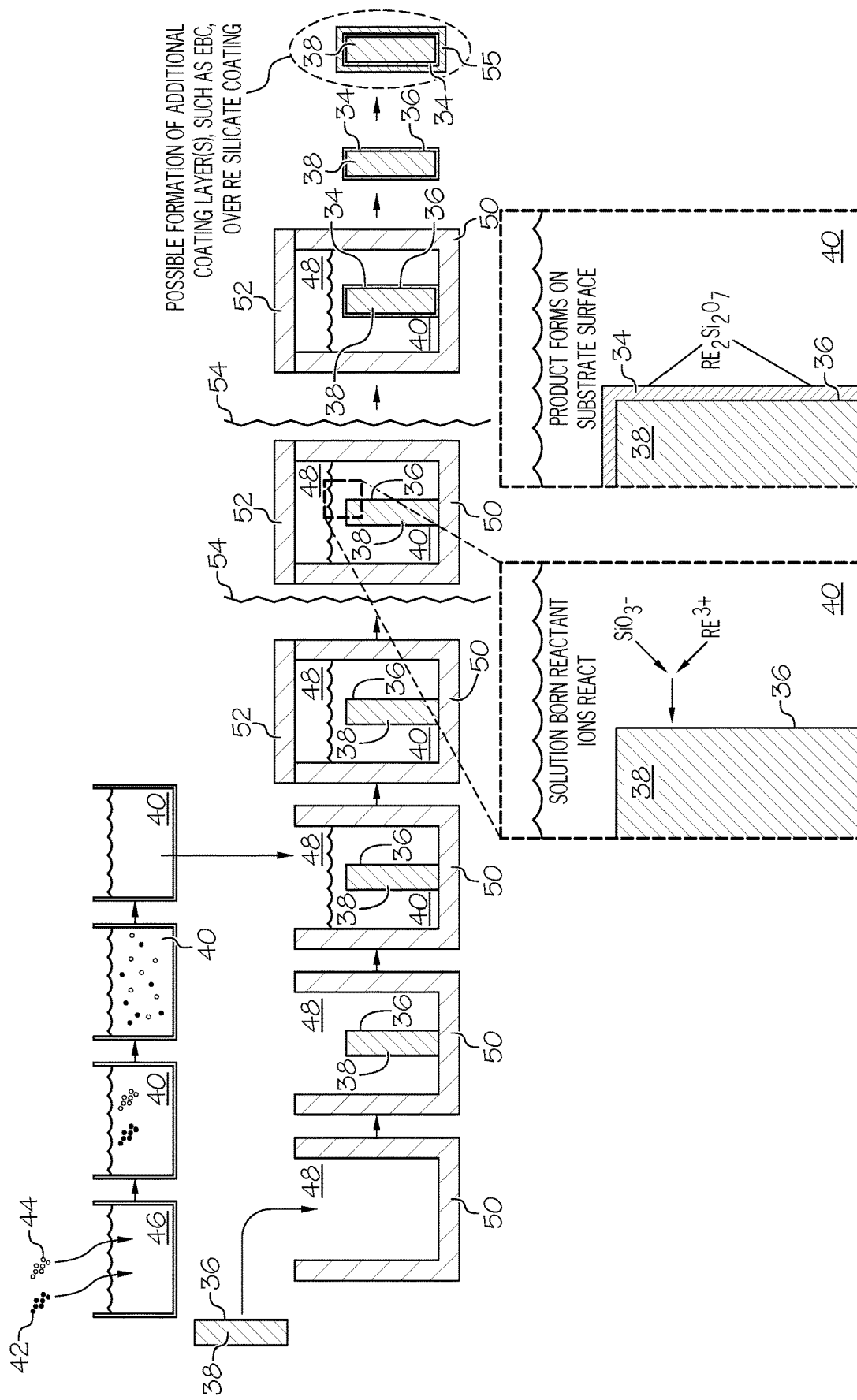
FIG. 2 illustrates exemplary process steps in which multiple soluble reactants are dispersed in solution and utilized to form an RE silicate coating over a ceramic component during an implementation of the solvothermal growth process in which at least one of the reactant additives serves as a silicate anion source.

FIG. 2 illustrates an implementation of RE silicate coating formation sub-process 32 in which soluble reactants additives are reacted to form an RE silicate coating 34 over silicon-containing surface regions 36 of a generalized ceramic component 38 during the solvothermal growth process. In this example, at least one of the reactants added to the reaction solution as an additive or compound serves as a silicate anion source. A non-illustrated surface oxide may or may not be present on surfaces 36 of ceramic component 38; however, if present, the surface oxide does not act as a reactant in this exemplary implementation, but rather serves as a template for nucleation of the desired product layer.

During the series of steps depicted in the upper portion of FIG. 2, a reaction solution 40 is prepared. Reaction solution 40 may be prepared by adding an RE cation source 42 and a silicate anion source 44 in powder form to a suitable solvent 46, such as water. After dissolution and distribution of sources 42, 44 throughout solvent 46, reaction solution 40 may be introduced into a chamber 48 of a reaction vessel 50. Ceramic component 38 may be positioned within chamber 48 at this juncture in the process or, instead, placed in chamber 48 following filling with reaction solution 40. After positioning of ceramic component 38 and reaction solution 40 within chamber 48, reaction vessel 50 is (e.g., hermetically) sealed utilizing a lid or cover 52. A heating element, furnace, oven, or the like (represented by symbols 54) is then utilized to heat reaction vessel 50 and thereby raise the temperature and pressure of reaction solution 40 within chamber 48 to desired levels. As indicated in the lower portion of FIG. 2, this results in a reaction between the solution-borne silicate anion source ($SiO_3$—) and the solution borne RE cation source ($RE^{3+}$) to yield a desired RE silicate product layer ($RE_2Si_2O_7$). Afterwards, reaction vessel 50 is allowed to cool and is unsealed. Ceramic component 38, now having one or more surfaces covered by coating 34, is removed from reaction vessel 50 as shown on the rightmost image of FIG. 2. The foregoing process steps may be repeated, as needed, to grow the RE silicate coating to a desired thickness. Afterwards, one or more additional coating layers, such as an EBC 55, may be formed over RE silicate coating 34. Alternatively, RE silicate coating 34 may be left as a standalone protection solution or instead further chemically modified in some manner; e.g., by the deposition and diffusion of additional materials into coating 34.

Figure 3:
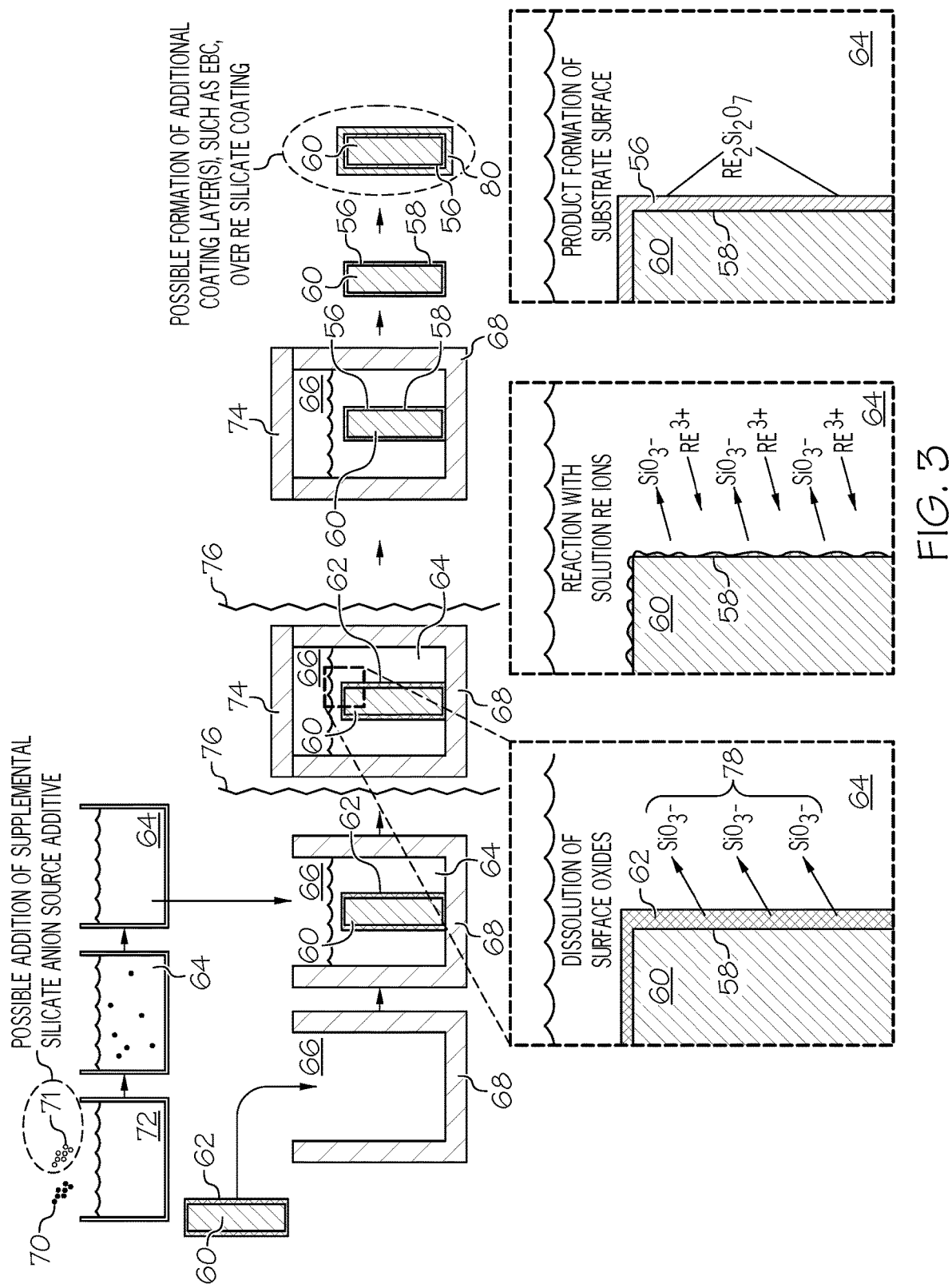
FIG. 3 illustrates exemplary process steps in which at least one soluble reactant additive serving as an RE cation source is utilized to form an RE silicate coating over a ceramic component, while a native surface oxide of the component is leveraged as a silicate anion source.

Turning lastly to FIG. 3, a further implementation of sub-process 32 is depicted in which soluble reactants are utilized to form an RE silicate coating 56 over silicon-containing surface regions 58 of a generalized ceramic component 60. In this example, ceramic component 60 has a native surface oxide 62, which is leveraged as a silicate anion source during the solvothermal growth process. As was previously the case, a reaction solution 64 is initially prepared and added to a reaction chamber 66 of a reaction vessel 68. Reaction solution 64 is prepared by adding at least one RE cation source 70 in powder form to a liquid solvent 72, such as water. As further indicated in FIG. 3, one or more compounds or other additives 71 serving as a supplemental silicate anion source can also potentially be added to reaction solution 64; however, this is not strictly necessary as surface oxide 62 is leveraged as the silicate anion source in this embodiment. Again, reaction vessel 68 is sealed with a lid or cover 74, and then heated utilizing a heating element or apparatus 76. As indicated in the lower portion of FIG. 3, this results in a first reaction by which the surface oxide is dissolved into reaction solution 64 to become a solution-borne silicate anion source 78, and a second reaction by which the silicate anion source combines with the RE cation source 70 to yield the desired product, namely, RE silicate coating 56. RE silicate coating 34 may serve as a standalone protection solution, may be chemically modified by further processing, and/or may serve as a bondcoat over which one or more additional coating layers (e.g., EBC 80 shown in the rightmost image in FIG. 3) are subsequently produced.

Example of the Coating Formation Method Reduced to Practice

Embodiments of coating formation method 10 (FIG. 1) have been reduced to practice. In one instance, a SiN material identified as "NT154" was obtained from COORSTEK Inc., currently headquartered in Golden, Colo. The SiN material was heat treated for 60 hours at approximately 1025° C. in an open air environment to increase the average thickness of the native surface oxide ($SiO_2$) to about 1 μm. A reaction solution was prepared containing $6\times10^{-4}$ mol of $Yb(NO_3)_3*5H_2O$, $2.4\times10^{-3}$ mol Trisodium Citrate, and $1.8\times10^{-2}$ mol $NH_4OH$ in 60 ml deionized water. The component and reaction solution were batched into a 125 ml Teflon-lined reaction vessel. Heat was applied to the sealed vessel to bring the reaction solution to a peak temperature of about 240° C. The reaction solution was maintained at this peak temperature for approximately twelve hours, during which time the above-described solvothermal growth process occurred. Afterwards, the newly-coated component was retrieved and subjected to heat treatment at 1200° C. for 30 minutes. These steps were then repeated three times to achieve complete coverage of the component with a RE silicate coating composed of ytterbium disilicate (YbDS) and grown to a desired thickness.

CONCLUSION

There has thus been provided processes by which RE silicate coatings are solvothermally grown over selected surfaces of ceramic components. Once formed, the RE silicate coatings provide considerable flexibility in usage and can serve as a standalone protective coating, as a bondcoat over which additional layers or multilayer coating systems (e.g., an EBC) is formed, or as a precursor material subject to additional reactions to arrive at the final protective layer chemistry. In most, if not all of these cases, the RE silicate coatings may be grown directly on the selected surfaces of the ceramic (e.g., turbomachine) components and, in at least some instances, may allow the formation of coating or coating systems eliminating reliance on conventional metallic bondcoats. As a result, common failure pathways leading to failure of conventional coating systems containing metallic bondcoats are precluded. Embodiments of the solvothermally-formed high temperature coating formation processes can thus extend component life by eliminating common failure modes associated with conventional EBC coating systems. As a further advantage, the above-described solvothermal coating formation process are largely unrestricted by line-of-sight requirements to allow coating of components having relatively complex surface geometries.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A method for producing a high temperature coating over a ceramic component, the method comprising:
at least partially filling a reactor vessel with a reaction solution containing a solution-borne rare earth cation source;
submerging a silicon-containing surface region of a ceramic component in the reaction solution; and
carrying-out a solvothermal growth process during which the reaction solution is subject to elevated temperature and pressure conditions within the reactor vessel in the presence of a silicate anion source, which reacts with the solution-borne rare earth cation source to grow at least one rare earth silicate layer over the silicon-containing surface region of the ceramic component.

2. The method of claim 1 wherein the silicon-containing surface region comprises a native surface oxide; and
wherein the method further comprises utilizing the native surface oxide as the silicate anion source during the solvothermal growth process.

3. The method of claim 1 further comprising:
approximating an amount of native surface oxide present on the silicon-containing surface region; and
selecting an amount of the solution-borne rare earth cation source within the reaction solution based, at least in part, on the amount of native surface oxide and an expected product stoichiometry.

4. The method of claim 2 further comprising selecting the reaction solution to contain a silicon oxide dissolving agent in which the native surface oxide dissolves during the solvothermal growth process to react with the solution-borne rare earth cation source; and
wherein the method further comprises, after elapse of an initial time period during which at least a portion of the native surface oxide dissolves in the reaction solution, continuing to grow the rare earth silicate layer over the silicon-containing surface region of the ceramic turbomachine component, while reducing exposure of the silicon-containing surface region to the silicon oxide dissolving agent.

5. The method of claim 4 wherein reducing comprises reducing exposure of the silicon-containing surface region to the silicon oxide dissolving agent by at least partially draining the reactor vessel of the reaction solution and then refilling the reactor vessel with a second reaction solution lacking or containing a lesser amount of the silicon oxide dissolving agent.

6. The method of claim 2 further comprising thermally growing the native surface oxide to desired thickness prior to carrying-out the solvothermal growth process.

7. The method of claim 1 further comprising introducing into the reaction solution a silicon-containing additive, which dissolves in the reaction solution to produce the solution-borne silicate anion source.

8. The method of claim 1 further comprising:
initially carrying-out the solvothermal growth process to grow a base rare earth silicate layer over the silicon-containing surface region of the ceramic component; and
repeating the solvothermal growth process on an iterative basis to grow at least one additional rare earth silicate layer over the base rare earth silicate layer to produce a multilayer rare earth silicate coating having a desired thickness.

9. The method of claim 1 further comprising, after carrying-out the solvothermal growth process, forming an environmental barrier coating layer over the rare earth silicate layer.

10. The method of claim 1 further comprising selecting the ceramic component to comprise a silicon-ceramic turbomachine component.

11. The method of claim 1 further comprising:
selecting the solution-borne rare earth cation source to comprise ytterbium; and
carrying-out the solvothermal growth process to form the rare earth silicate layer to comprise at least 80% ytterbium disilicate by weight.

12. The method of claim 1 further comprising carrying-out the solvothermal growth process at a peak temperature exceeding 150 degrees Celsius.

13. The method of claim 1 wherein the solvothermal growth process is carried-out at a first peak temperature, and wherein the method further comprises heat treating the RE silicate coating after the solvothermal growth process at a second peak temperature exceeding the first peak temperature.

14. A method for producing a rare earth silicate coating over a silicon-containing surface region of a component, the method comprising:
- placing the component in a reaction vessel at least partially filled with a reaction solution;
- hermetically sealing the reaction vessel; and
- after hermetically sealing the reaction vessel, heating the reaction vessel to increase the temperature and pressure of the reaction solution and form at least a first RE silicate layer over the silicon-containing surface region, the first rare earth silicate layer formed as product of a reaction between a silicate anion source and a rare earth ration source dissolved in the reaction solution.

15. The method of claim 14 further comprising, prior to placement of the component in the reaction vessel, growing a silica scale on the silicon-containing surface region to an average thickness between about 0.5 and about 2 microns.

16. The method of claim 14 wherein the silicon-containing surface region comprises a silicon oxide layer, and wherein the method further comprises adding a silicon oxide dissolving agent to the reaction solution prior to hermetically sealing the reaction vessel to promote dissolution of the silicon oxide layer into the reaction solution.

17. The method of claim 14 further comprising growing one or more additional RE silicate layers over the first rare earth silicate layer to impart the RE silicate coating with a predetermined thickness.

18. A method for producing a high temperature coating over a ceramic component, the method comprising:
- growing a surface oxide over a silicon-containing surface region of the ceramic component;
- dissolving at least a portion of the surface oxide in a reaction solution to produce a silicate anion source;
- after dissolving at least a portion of the surface oxide in the reaction solution, forming a rare earth silicate coating over the surface of the ceramic component, forming comprising:
  - reacting the silicate anion source with a rare earth cation source further contained in the reaction solution to form at least one rare earth silicate layer over the surface of the ceramic component.

19. The method of claim 18 wherein dissolving comprises contacting the surface oxide with silicon oxide dissolving agent contained in the reaction solution.

20. The method of claim 18 wherein reacting comprises:
- reacting the silicate anion source with the rare earth cation source to form a base rare earth silicate layer over the surface of the ceramic component; and
- forming one or more additional rare earth silicate layers over the base rare earth silicate layer to impart the rare earth silicate coating with a desired thickness.

* * * * *